United States Patent
Buhrer

[11] 3,813,142
[45] May 28, 1974

[54] ELECTRO-OPTIC VARIABLE PHASE DIFFRACTION GRATING AND MODULATOR

[75] Inventor: Carl F. Buhrer, Framingham, Mass.
[73] Assignee: GTE Laboratories Incorporated, Waltham, Mass.
[22] Filed: Dec. 4, 1972
[21] Appl. No.: 312,071

[52] U.S. Cl. .... 350/96 WG, 350/160 R, 350/162 R
[51] Int. Cl............................ G02b 5/14, G02f 1/16
[58] Field of Search........... 350/96 WG, 160 R, 161

[56] References Cited
UNITED STATES PATENTS
3,695,745  10/1972  Furukawa...................... 350/96 WG
3,736,045  5/1973  Heidrich et al. ........... 350/96 WG X OTHER PUBLICATIONS
Miller "A Survey of Integrated Optics" IEEE Journal of Quantum Electronics, Vol. QE-8, No. 2, Feb. 1972, pp. 199–205.
Hammer "Digital Electro–Optic Grating Deflector and Modulator" Applied Physics Letters, Vol. 18, No. 4, Feb. 15, 1971, pp. 147–149.

Primary Examiner—John K. Corbin
Attorney, Agent, or Firm—Irving M. Kriegsman

[57] ABSTRACT

An electro-optic variable phase diffraction device is described for varying a phase diffraction grating and modulating an optical wave. A layer of electro-optic material whose index of refraction may be varied with an electric field is placed in interacting relationship with an optical wave passing through a thin-film optical waveguide. An array of parallel spaced electrodes whose widths are substantially more narrow than the width of the optical wave are so located over the optical waveguide to form longitudinal segments in the electro-optical material for interaction with different adjacent components of the optical wave. A controlled electrical energization of the electrodes causes a corresponding change of refractive index of underlying interacting segments to form a diffracted output optical wave whose intensity is modulated in correspondence with the electrical energization. Various embodiments and methods of modulation are described.

2 Claims, 4 Drawing Figures

3,813,142

ELECTRO-OPTIC VARIABLE PHASE DIFFRACTION GRATING AND MODULATOR

FIELD OF THE INVENTION

This invention relates to the phase diffraction gratings. More specifically, this invention relates to an electro-optical modulator for guided optical waves.

BACKGROUND OF THE INVENTION

A substantial recent development in communication has been in a new field known as integrated optics. Light waves can be guided in a thin transparent film as, for example, described in an article entitled "A Survey of Integrated Optics" written by Stewart E. Miller and published in the IEEE Journal of Quantum Electronics, Vol. QU-8, No. 2 February 1972 at page 199.

Electro-optic modulators based on the Kerr and Pockels effect have been known. In the Kerr cell a change in the optical constants of some liquid or solid results from the square of the intensity of an applied electric field and is thus polarity independent. In a Pockels cell one or more of the refractive indices of a non-centrosymmetric crystal respond linearly to an applied electric field intensity.

In an article entitled "Integrated Optics" written by S. E. Miller and published in the Bell System Technical Journal Vol. 48, September 1969, No. 7, page 2,059, a phase modulator is described on page 2065 for a guided light wave. An electro-optic material is either located as a substrate below an optical waveguide or is placed as a thin surface layer adjacent to the optical waveguide. A pair of electrodes extending along the optical waveguide enables the creation of a large electrical field to phase modulate an optical wave traveling along the guide.

SUMMARY OF THE INVENTION

In an electro-optic variable phase diffraction grating and modulator in accordance with the invention, an optical beam sustaining material is placed in interacting relationship with an electro-optic material which alters its index of refraction in response to an electric field. An array of electrodes is so located relative to the electro-optic material to form adjacent longitudinal regions of different indices of refraction upon electrical excitation of the electrodes. The optical beam passing through these regions is effectively phase modulated by the components across the width of the beam to exit in part as a diffracted output beam with an amplitude which corresponds with the electrical excitation. The longitudinal interacting regions are substantially more narrow in width than the width of the beam to obtain the desired diffraction and modulation.

As described with respect to a specific embodiment of a modulator in accordance with the invention, a thin-film waveguide and an electro-optic material are placed adjacent one another to produce a strong evanescent segment in the electro-optic material of an optical wave traveling in the waveguide. An array of spaced parallel electrodes are placed along the traveling direction of the guided wave to modulate the optical wave. The electrodes are substantially more narrow in comparison to the width of the guided wave as measured along a direction which is transverse to the optical wave. The electrodes are selectively coupled to a signal source to effectively alter the phase between components of the optical wave traveling along the waveguide.

The region of the optical waveguide under the influence of the array of electrodes operates as a phase diffraction grating having a fixed period, i.e. a fixed distance between electrodes, with a voltage variable phase. The guided wave, as a result, is diffracted in a predetermined direction with an intensity or amplitude dependent upon the voltage applied to the array of electrodes. When the modulating voltage is a time varying signal, the diffracted guided wave forms a double sideband suppressed carrier modulated optical wave whose traveling direction is a function of the spacing between the electrodes in the array.

The array of electrodes enables a variety of modulations of optical guided waves for purposes such as a single side band suppressed carrier optical signal generation and pulse modulation to match the phase within a pulse to a transmission medium such as a fiber for minimum pulse dispersion.

It is, therefore, an object of the invention to provide a phase variable electro-optic diffraction grating and modulator.

BRIEF DESCRIPTION OF DRAWINGS

This and other objects of the invention will be understood from the following description of several embodiments described in conjunction with the drawings wherein.

DETAILED DESCRIPTION OF EMBODIMENTS

Figure 1:
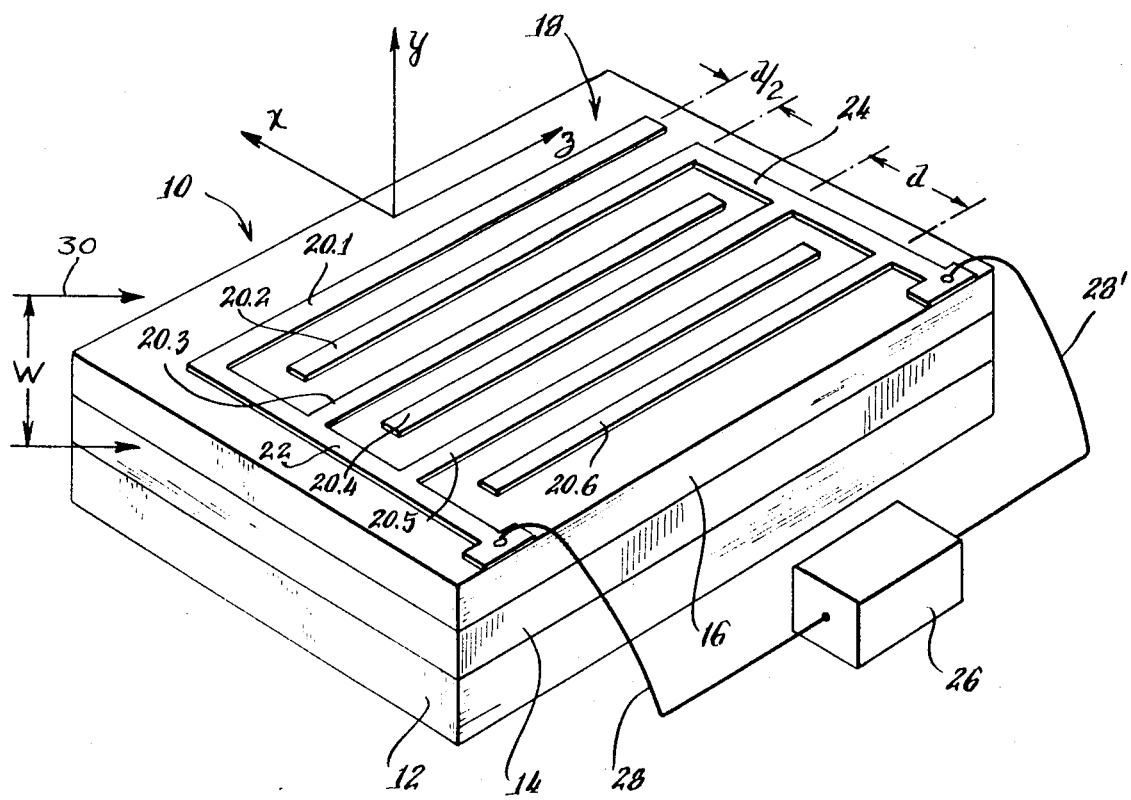
FIG. 1 is a greatly enlarged perspective representation of an electro-optical variable phase diffraction grating and modulator in accordance with the invention.

With reference to FIG. 1, an integrated optical modulator 10 is shown formed of a substrate 12, a thin-film optical waveguide layer 14 and a thin-film optically transparent isolating layer 16.

Substrate 12 is formed of an electro-optic crystal whose electric field sensitive axis is so oriented that the electrically controlled refractive indices influence the phase velocity of guided optical waves such as 30 traveling in optical waveguide 14. There are a host of electro-optic materials suitable for a modulator 10 with a crystal such as $S_{r_x} B_{a_{1-x}} N_{b_2} O_6$ particularly desirable. In the latter crystal the tetragonal C axis is the electric axis and is oriented along the $x$ axis.

The thin-film optical waveguide 14 is formed of a material whose refractive index is slightly higher than the crystal substrate 12. The use of close indices of refraction for substrate 12 and optical waveguide 14 assures a significant amount of evanescent wave energy in the substrate for interaction with the electro-optical crystal substrate 12. For example, the niobate crystal $S_{r.25} B_{a.75} N_{b_2} O_6$ having an $n_e$ at 25°C of 2.26 may be used with an optical waveguide film formed of ZnS having an index of refraction of 2.3.

The optically transparent isolating thin-film 16 is formed of a material whose index of refraction is much lower than that of optical waveguide thin-film 14 and supports an electrode array pattern generally indicated at 18.

The electrode array 18 is formed of parallel electrodes 20 equally spaced center to center by a distance $d/2$ and aligned parallel with the z axis. Electrodes 20 are alternately connected to pattern leads 22, 24 which, in turn, are coupled to an electrical signal source 26 through wires 28–28'.

Electrodes 20 are made quite narrow in comparison with the width W, of optical wave 30 propagating in a direction making an angle $\theta$ with the z axis. The electrodes may be formed of aluminum with the width of the electrodes being a fraction of a micron wide.

Optical wave 30 may be launched into optical waveguide 14 with a variety of techniques such as described in the first mentioned article by S. E. Miller. When no voltage is supplied by signal source 26, optical wave 30 passes beneath array 18 without any effect by electrodes 20 because of the isolating thin-film 16.

When an AC signal is supplied to leads 28–28', the odd electrodes 20.1, 20.3, and 20.5 are alternately positive relative to the even electrodes 20.2, 20.4 and 20.6. At the instant when the odd electrodes are positive relative to the even electrodes, the effective refractive index of a guided wave located between electrodes 20.1 and 20.2, 20.3 and 20.4 and 20.5 and 20.6 changes in opposite direction relative to those wave components lying between electrodes 20.2 and 20.3, 20.4 and 20.5. The relative change may be an increase or decrease depending upon the orientation of the crystal axes in substrate 12. During this instant when the odd electrodes are positive relative to the even electrodes the array 18 operates as a phase diffraction grating which diffracts optical wave 30, for example, in the direction 36 as shown in FIG. 2.

As the voltage between the odd and even electrodes is changed, the amplitude of the diffracted wave in direction 36 will have been altered by linear proportion to the amplitude change in the signal applied to the electrodes. Hence, when the AC signal source 26 is a time varying signal, the diffracted wave 36 is a double sideband suppressed carrier modulated optical wave.

Diffraction only takes place in a coherent manner when the input and output angles $\theta_1$ and $\theta_2$ are equal and satisfy Bragg's diffraction equation $2d \sin \theta = \rho\lambda/\eta$ where $\rho$ is the order of diffraction, and $\lambda/\eta$ is the wavelength of optical wave 30 in waveguide 14. The value of $\rho$ is preferably equal to 1 since maximum intensity is found in the first order.

Figure 2:
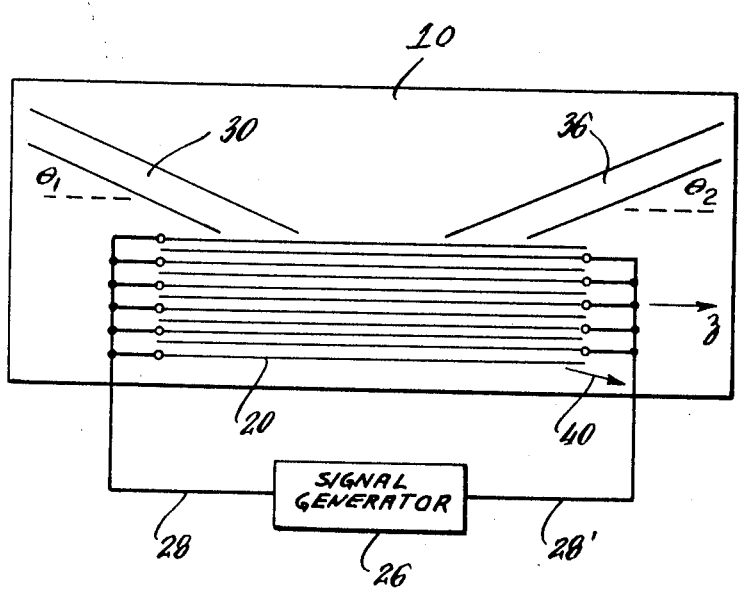
FIG. 2 is a schematic representation of the diffraction effect on a guided optical wave with a modulator in accordance with the invention for use with an optical wave propagating in a particular direction.

The modulator 10 in FIG. 2 is particularly suitable for pulse modulation by applying corresponding pulses from signal source 26 to the several electrodes 20. In the absence of a signal from source 26, no output wave is diffracted in the direction of $\theta_2$ and the propagation of the optical wave continues along the $\theta_1$ direction so that the wave emerges in the direction it was moving at the input end as shown with arrow 40. When a voltage is applied by signal generator 26, a diffraction pattern is formed resulting in output wave 36.

Figure 4:
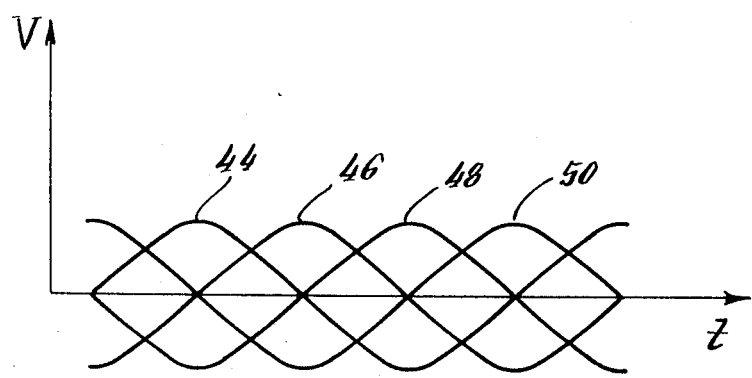
FIG. 4 is a waveform diagram of electrical modulating signals used to generate the modulated optical output wave with the embodiment shown in FIG. 3.
Figure 3:
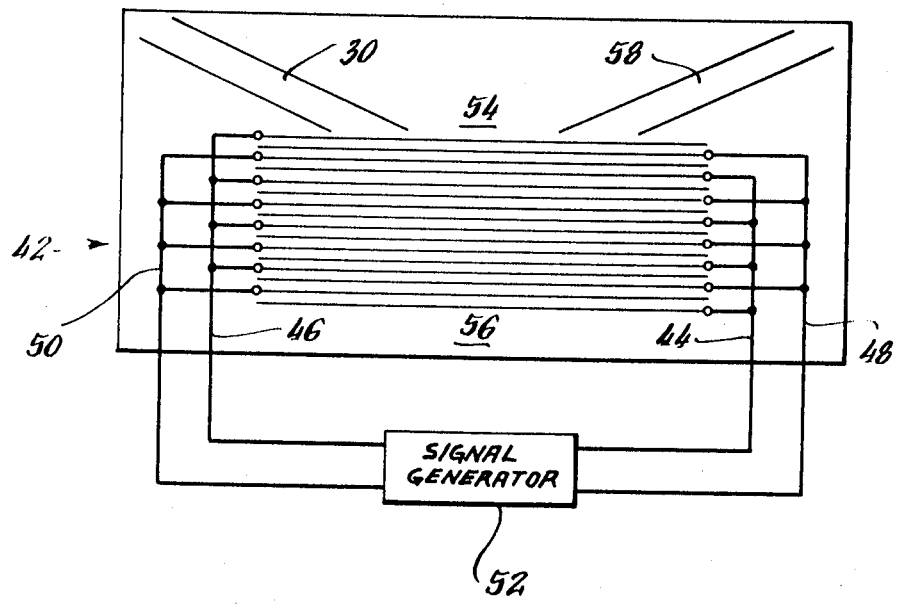
FIG. 3 is a schematic representation of a modulator in accordance with the invention for providing a single side band suppressed carrier optical signal.

The modulator 42 shown in FIG. 3 utilizes a plurality of sets 44, 46, 48 and 50 of electrodes 20. These sets are excited with polyphase alternating signals from generator 52 in a manner whereby inputs 44, 48 are 180° out of phase, and 46, 50 are 180° out of phase while 90° phase differences occur between adjacent electrodes 20. FIG. 4 shows the relative phases of signals produced by generator 52.

If the sense of phase sequence is such that electrode set 44 leads set 46 which leads set 48 and which, in turn, leads set 50 etc., the voltages produce a phase diffraction grating that appears to move from 54 to 56. The diffraction angle $\theta$ is then determined by the same relationship $\rho\lambda/\eta = 2d \sin \theta$, but the grating period is $d$ and is four times the distance between adjacent electrodes.

The diffracted wave 58 has a lower frequency than input wave 30 because of the Doppler shift resulting from the effective downward motion of the diffraction grating. For a single frequency input wave 30, the diffracted output wave 58 is downwardly shifted in frequency by the modulating frequency of the signal from generator 52. A reversal of the phase sequence of the signals from generator 52 will cause an upward shift of the frequency of output wave 58. When more complex modulating signals are produced by generator 52 and the 90° phase relations retained for each frequency component, the diffracted output wave 58 becomes a single side band suppressed carrier optical signal.

The single sideband optical modulation of output wave 58 is particularly advantageous for use with optical transmission media. The single sideband signal is much less sensitive to group velocity dispersions caused by such media as optical fibers and thin-film optical waveguides.

By applying to the modulator embodiment shown in FIG. 3 more general signal waveforms, it is possible to produce a diffracted output wave having arbitrary phase and amplitude variations with time. For example, a voltage applied between inputs 48 and 44 will induce a diffraction grating yielding the same diffracted wave amplitude as that produced by the same voltage applied to inputs 46 and 50, but the location of the grating will be displaced away from waves 30 and 58 by a quarter grating period. The optical phase in wave 58 produced by a voltage on inputs 48 and 44 will therefore lag the optical phase produced by a voltage on inputs 46 and 50 by 90°. By choosing a desired signal, the output wave produced by correspondence or relationship between input pairs, any phase and amplitude diffracted wave may be obtained. The polyphase single frequency input of FIG. 4 is a special case because it induces a diffraction grating which gives a constant amplitude output diffracted wave with a constant rate of change of phase; that is, a simple frequency shift and a single side band modulation.

The ability to create any arbitrary phase and amplitude variation in the diffracted wave makes this embodiment especially suitable for matching pulsed optical modulation to optical transmission lines which often exhibit detrimental dispersive effects. For example, two sets of related pulse waveforms produced by generator 52 may be combined to establish a predetermined optical phase variation during the pulse of diffracted output wave 58. The phase variation of the diffracted output wave pulse is chosen such that the dispersive properties of the transmission medium have minimal broadening effect on the amplitude envelope of the pulse reaching the remote detector.

Variations of the embodiment shown in FIG. 4 exist which can perform in a similar manner. For example, three or more sets of interspaced electrodes rather than four can, with suitable modification of the generator 52, give equivalent results.

Having thus described an electro-optic variable phase diffraction grating and modulator, the advantages of the invention can be understood. A flexible and controllable method of modulating optical waves is described for generating a variety of optimum modulated optical signals.

What is claimed is:

1. A variable electro-optic phase diffraction grating modulator comprising
    a thin-film optical waveguide sized to propagate an optical wave of predetermined width along a preselected direction;
    a layer of electro-optic material placed in proximity to the thin-film optical waveguide for interaction with the optical wave propagating therein;
    an array of generally parallel spaced longitudinal electrodes located to control the index of refraction of the electro-optic material which interacts with the optical wave upon the electrical excitement of the electrodes, each of said electrodes having a width dimension which is smaller than the width of the optical wave, with the spacings between electrodes being selected to control the index of refraction of individual segments of the electro-optic material in interaction with the optical wave, selected electrodes being electrically connected to each other to form sets with the electrodes in the sets being interleaved to form pairs of electrodes with adjacent electrodes of different sets; and
    means for electrically exciting pairs of electrodes with different electrical signals to induce correspondingly different indices of refraction in the electro-optic material segments and form a diffracted modulated optical output wave along a desired angle with a modulation component related to said electrical signals, said means further producing a plurality of phase related signals connected to respective sets of electrodes to form an apparently moving diffraction grating.

2. The modulator as claimed in claim 1 wherein said phase related signals are applied to electrodes in the sets to form pairs of adjacent electrodes carrying signals which differ in phase by 90° in a polyphase sequence selected to modulate the diffracted optical output wave in a single side band suppressed carrier manner.

* * * * *